(12) United States Patent
Behnke et al.

(10) Patent No.: US 8,550,769 B2
(45) Date of Patent: Oct. 8, 2013

(54) WIND TURBINE WITH A YAW SYSTEM AND METHOD FOR THE YAW ADJUSTMENT OF A WIND TURBINE

(75) Inventors: Merten Behnke, Alt Farpen (DE); Andre Sievers, Bastrof (DE)

(73) Assignee: Nordex Energy GmbH, Norderstedt (DE)

( * ) Notice: Subject to any disclaimer, the term of this patent is extended or adjusted under 35 U.S.C. 154(b) by 571 days.

(21) Appl. No.: 12/889,579

(22) Filed: Sep. 24, 2010

(65) Prior Publication Data
US 2011/0171022 A1 Jul. 14, 2011

(30) Foreign Application Priority Data
Jan. 14, 2010 (EP) .................................... 10000294

(51) Int. Cl.
*F03D 7/02* (2006.01)
*F03D 11/00* (2006.01)
(52) U.S. Cl.
USPC ............... 415/1; 415/4.3; 415/4.5; 415/123; 415/127; 415/908; 416/1; 416/9; 416/155; 416/169 R
(58) Field of Classification Search
USPC ................ 416/1, 9, 155, 169 R; 415/1, 2.1, 415/4.3, 4.5, 123, 127, 908; 290/44, 55
See application file for complete search history.

(56) References Cited

U.S. PATENT DOCUMENTS

| 5,035,575 | A | * | 7/1991 | Nielsen et al. ................... 416/9 |
| 6,945,752 | B1 | * | 9/2005 | Wobben .................... 416/170 R |
| 7,398,867 | B2 | * | 7/2008 | Agardy et al. ............... 188/72.9 |
| 7,944,070 | B2 | * | 5/2011 | Rosenvard et al. ............. 290/44 |

FOREIGN PATENT DOCUMENTS

| DE | 100 23 440 | 12/2001 |
| DE | 203 14 822 | 3/2005 |
| DE | 10 2008 004 712 | 12/2008 |
| EP | 1 650 432 A2 | 10/2005 |

* cited by examiner

*Primary Examiner* — Igor Kershteyn
(74) *Attorney, Agent, or Firm* — Vidas, Arrett & Steinkraus, P.A.

(57) ABSTRACT

A wind turbine comprising a tower and a nacelle which is rotatably mounted on the tower and whose alignment is adjustable by way of a yaw system, wherein the yaw system has at least one adjusting drive, a rotatable yaw bearing, at least one brake disk and at least two brake units which can exert a braking torque on the brake disk, wherein the at least one of the brake units has a first brake pad with a first coefficient of friction, and at least one of the brake units has a second brake pad with a second coefficient of friction, wherein the first and the second coefficient of friction are different from each other.

10 Claims, 3 Drawing Sheets

WIND TURBINE WITH A YAW SYSTEM AND METHOD FOR THE YAW ADJUSTMENT OF A WIND TURBINE

CROSS-REFERENCE TO RELATED APPLICATIONS

Not applicable.

STATEMENT REGARDING FEDERALLY SPONSORED RESEARCH

Not applicable.

BACKGROUND OF THE INVENTION

The present invention is related to a wind turbine with a yaw system and to a method for the adjustment of the yaw alignment of the wind turbine.

In order to maximise the output of a wind turbine and to reduce the loads on the wind turbine, a rotor of the wind turbine connected to a nacelle is permanently aligned to the wind direction. The wind turbine usually consists of a tower and nacelle that is rotatably mounted on the tower top. The nacelle carries the rotor with at least one rotor blade and a generator, which converts the torque taken up from the wind by the rotor into electrical power.

In wind turbines, it is known to use a motor driven yaw system for the wind direction adjustment of the nacelle. The yaw system is normally disposed between a tower top and the nacelle, wherein the components of the yaw system may be situated in the nacelle as well as in the tower. The yaw system has at least one adjustment drive, which may be equipped with a gearbox, and a yaw bearing, whose inner ring or outer ring has a toothing or is connected to a gear rim. Further, the yaw system is equipped with at least one brake unit, which usually has one or several brake calipers that co-operate with the brake disk(s). The brake calipers each carry brake pads, which sit firmly on the brake disk when the brake caliper is tightened. A pinion connected to the adjustment drive engages with the toothing in order to adjust the yaw alignment of the nacelle, and by this it permits the rotation of the nacelle on the tower top. The adjustment drive is usually fastened on the nacelle, whereas the toothing is made stationary with respect to the tower. After completed yaw adjustment of the nacelle, the nacelle is immobilized by the brake units. These generate the holding torque that is necessary for the nacelle. The holding torque is selected so high that the wind forces acting upon the rotor cannot change the yaw alignment of the nacelle.

In order to avoid oscillation of the nacelle excited by the rotor and by possible turbulences of the wind during the yaw adjustment of the nacelle, the movement of the nacelle is damped during the yaw adjustment. It is known to exert a residual holding torque on the brake disks via the brake units even during the yaw alignment.

From DE 100 23 440 C1, the entire contents of which is incorporated herein by reference, it is known to leave only one or two brake units of the yaw system engaged during the yaw adjustment of the nacelle, in order to ensure the necessary damping of the adjustment process. In this, the adjusting drive is dimensioned such that the nacelle can be adjusted against the applied residual holding torque. Through the residual holding torque of the brakes and the low circumferential velocity in the yaw adjustment, a so-called stick-slip-effect occurs between the brake calipers and the brake disk. The stick-slip-effect occurs in the transition from static friction to sliding friction and vice versa. The oscillations on the tower and the nacelle that occur through the stick-slip-effect lead to mechanical loads. Moreover, the occurrence of the stick-slip-effect is accompanied by the generation of noise. Sometimes the sound emitted by the stick-slip-effect can exceed legally permitted values, so that the wind turbine must be shutdown.

The present invention is based on the objective to provide a wind turbine with a yaw system and a method for the adjustment of the yaw alignment of the nacelle which reliably avoid the occurrence of the stick-slip-effect and of the oscillations and noise emissions accompanied by the same.

The wind turbine according to the present invention has a tower and a nacelle which is rotatably mounted on the tower and whose alignment is adjustable by means of a yaw system. The yaw system has at least one drive, a rotatable yaw bearing, a yaw brake disk and at least two brake units which can exert a holding and/or braking torque on the brake disk. At least one of the brake units has a first brake pad with a first coefficient of friction. According to the present invention, at least one of the other brake units is equipped with a second brake pad which has a second coefficient of friction. According to the present invention, the first and the second brake pad each have different coefficients of friction. By brake units that have different coefficients of friction, it is possible to provide the braking torque that is necessary during the adjustment of the nacelle by one or plural brake units, whose brake pad has a coefficient of friction at which the stick-slip-effect does not appear. Thus, the noise generation during the adjustment of the yaw alignment of the nacelle can be avoided. Even shocks that occur with the stick-slip-effect can be avoided by using two different brake pads in the yaw system.

In a preferred embodiment of the present invention, the coefficient of friction of the first brake pad is smaller than the coefficient of friction of the second brake pad. Due to its static friction between the brake pad and the brake disk, the second brake pad permits to hold the nacelle in a given position. The first brake pad is dimensioned such that a sliding friction appears between brake pad and brake disk. However, the coefficient of friction of the first brake pad is high enough to ensure damping of the adjusting movement.

In a preferred embodiment, the brake units having the first brake pad can be actuated independently from the brake units that have the second brake pad. The independent activation of brake units in the yaw system permits to pressurize the brake units having the first brake pad with such a brake pressure that the movement of the nacelle is damped during the adjustment of the yaw alignment, but the stick-slip-effect can be avoided. In this the brake pressure for avoiding the stick-slip-effect depends on the first coefficient of friction. The brake units with the second brake pad can be selectively pressurised or depressurized.

In a preferred embodiment, the brake units are annularly arranged around a brake disk that is attached on an inner or outer bearing ring of the yaw bearing. Brake units which are actuated hydraulically are preferably used. Alternatively, the brake disk may also be fixed on the tower or the machine frame.

In a preferred embodiment, the brake units having the first brake pad can be pressurized with at least two different brake pressures. In this way, the brake units with the first brake pad can be used in order to enhance the holding torque when immobilizing the nacelle or to apply the braking torque during the adjustment process of the nacelle.

The method of the present invention is used for the yaw adjustment on a wind turbine which has a yaw system with at least one adjusting drive, a rotatable yaw bearing, at least one brake disk and at least two brake units. At least one of the of the at least two brake units is equipped with a first brake pad having a first coefficient of friction, and at least one of the brake units is equipped with a second brake pad having a second coefficient of friction. According to the present invention, the first coefficient of friction is smaller than the second coefficient of friction. In the method of the present invention, a first brake pressure is applied on the at least one brake unit having the first brake pad. Further, the at least one brake unit that is equipped with the second brake pad is released. The method of the present invention further provides to actuate the adjusting drive for adjusting the yaw alignment against the brake pressure that is applied by the at least one brake unit having the first brake pad. In order to hold the nacelle in its predetermined position after the yaw adjustment is completed, subsequently a second brake pressure is applied on the at least one brake unit having the second brake pad. In the method of the present invention, a braking torque adapted to the brake pad is generated by those brake units that have a brake pad with a smaller coefficient of friction, so that the occurrence of a stick-slip-effect is avoided during the adjustment process.

In a preferred embodiment of the method of the present invention, the brake pressure of the brake unit with the second brake pad is subsequently applied also on those brake units that are equipped with the first brake pad. In this way, even these brake units contribute to hold the adjusted yaw alignment of the nacelle.

In a preferred embodiment of the method of the present invention, the first brake pressure which is applied on the brake units having the first brake pad in order to dampen the adjustment movement, is different from the brake pressure which is applied after the completion of the adjustment process in order to immobilize the nacelle, wherein the first brake pressure is preferably smaller than the second brake pressure.

In a preferred embodiment, the first brake pressure which is applied on the brake units having the first brake pad is equal to the brake pressure which is applied to the brake units having the second brake pad in order to immobilize the nacelle. In this case, the first brake pad must have a coefficient of friction which enables damping of the adjustment movement without stick-slip-effect when the brake pressure for generating the holding torque is applied. In case that there is only one value for the brake pressure, the brake units having the first brake pad are permanently pressurized by this brake pressure, whereas the brake pressure on the brake units having the second brake pad is selectively switched to this value or to zero.

An exemplary embodiment of the present invention is explained in more detail by means of the accompanying figures, wherein.

DETAILED DESCRIPTION OF THE INVENTION

Figure 1:
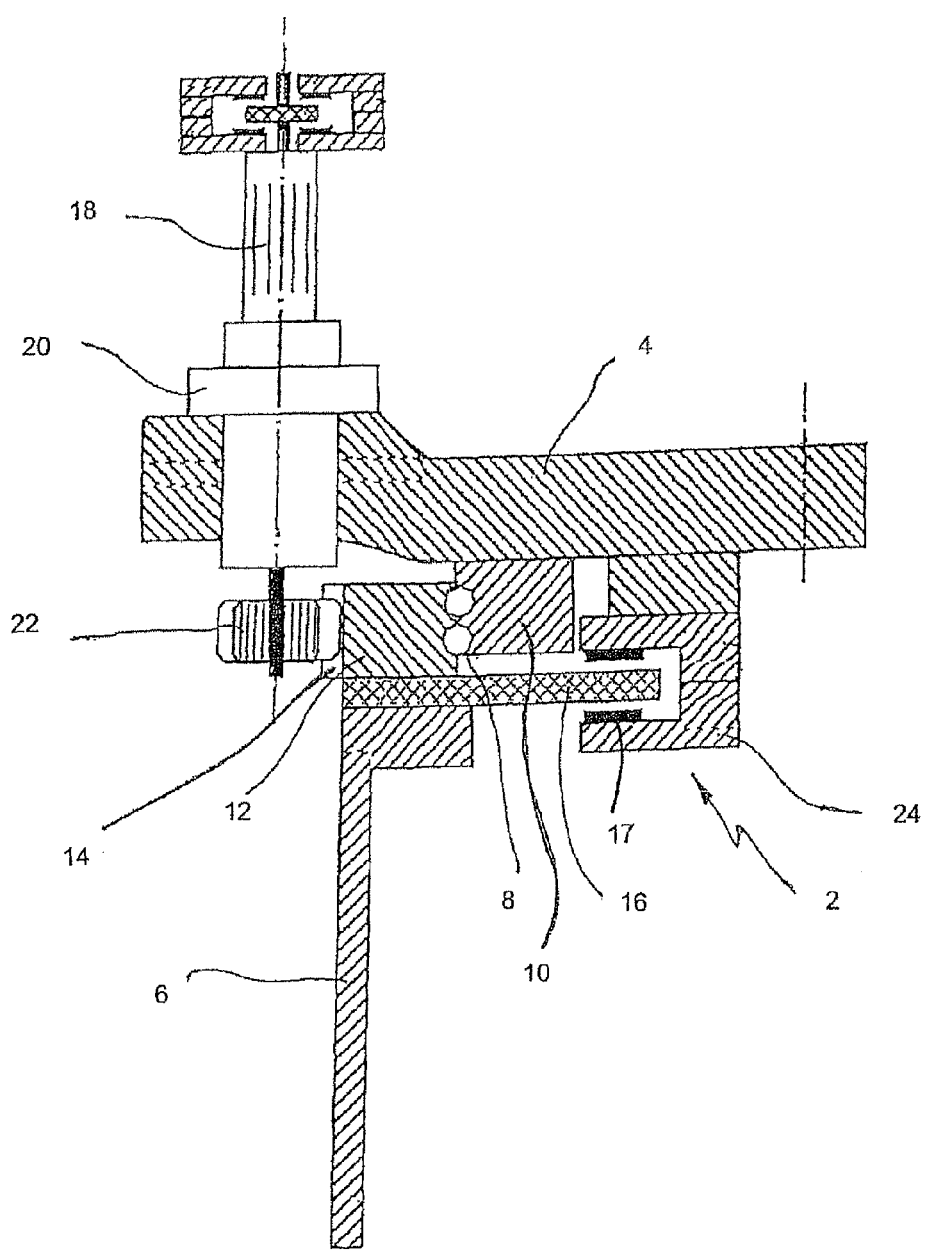
FIG. 1 shows a sectional view of a yaw system of a wind turbine.

While this invention may be embodied in many different forms, there are described in detail herein a specific preferred embodiment of the invention. This description is an exemplification of the principles of the invention and is not intended to limit the invention to the particular embodiment illustrated FIG. 1 shows a sectional view of a yaw system 2 of a wind turbine according to the present invention. The yaw system is mounted on a machine frame 4 shown in part of a nacelle not shown. It is provided for rotating the nacelle with respect to the tower 6 of the wind turbine shown in part. In this, the rotation takes place essentially around the longitudinal axis of the tower. The inner ring 10 of the slewing yaw bearing 8 is fixed to the machine frame 4. The corresponding outer ring 12 is provided with a toothing 14 and fixed to the tower 6. A brake disk 16 is placed between outer ring 12 and tower 6.

Via a gearbox 20, an adjustment drive 18 drives a pinion 22, which engages with the toothing 14. By actuating the adjustment drive 18, the machine frame 4 with the nacelle is rotated around the longitudinal axis of the tower.

Further, the machine frame 4 is provided with a schematically shown brake unit having brake calipers 24, which embrace the brake disk 16.

In the shown example, the brake calipers 24 are actuated hydraulically via a central hydraulic unit, which is arranged on the machine frame 4 in the nacelle. After completed wind direction adjustment, the nacelle is immobilized in the given alignment by engagement of the brake calipers 24 connected to the machine frame 4 with the brake disk 16 that is fixed on the tower. In this, a pressure is applied to the brake calipers which generates a holding torque. The brake pads 17 are each mounted on the brake calipers 24.

Figure 2:
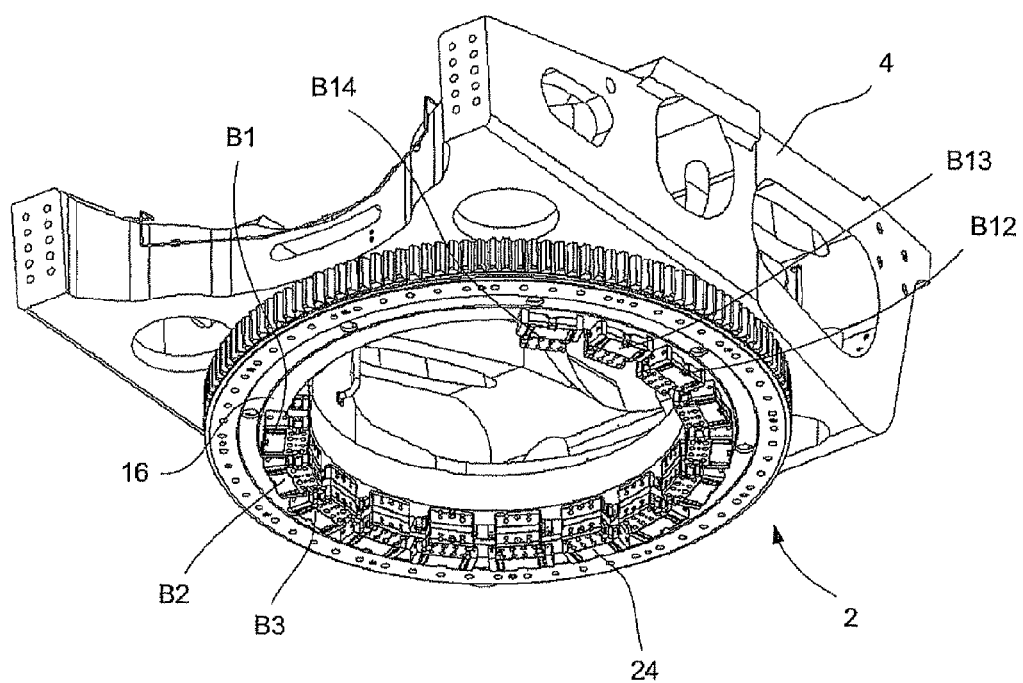
FIG. 2 shows a schematic view of a yaw system on a wind turbine.

The schematic representation in FIG. 2 shows the yaw system of the wind turbine mounted on the machine frame 4 in a perspective view. In the shown example, fourteen brake units B1 to B14 are provided, which engage with the annular brake disk 16.

The brake units B1 to B14 shown in FIG. 2 have different brake pads. The brake units B1 and B14 are equipped with sliding pads. The sliding pad permits a sliding friction between the brake pad and the brake disk during the adjustment process, provided that a braking torque adapted to the brake pad is applied. For instance, by addition of graphite, a sliding pad has a smaller coefficient of friction than a brake pad which is used for holding the yaw system. The smaller coefficient of friction of the sliding pad is selected such that damping of the yaw system is ensured, while a stick-slip-effect during the adjustment process is avoided through the smaller initial breakaway torque of the sliding pad.

The further brake units B2 to B13 are equipped with a holding pad as a brake pad. The pad has a greater coefficient of friction in relation to the sliding pad and generates the holding torque that is necessary for immobilizing the nacelle.

In order to immobilize the nacelle, a holding pressure $p_H$ is applied to the brake units B1 to B14, which generates the necessary holding torque. In case that the nacelle is intended to follow the wind direction, the brake units B2 to B13 can be depressurized. At the same time, a brake pressure $p_B$ is applied to the brake units B1 and B14, which is smaller than the holding pressure $p_H$ in the shown example and which generates the braking torque adapted to the sliding pad. This braking torque permits a defined sliding of the brake calipers equipped with sliding pads on the brake disk. The brake pressure $p_B$ is set such that the braking torque is sufficient to ensure a damping of the movement of the nacelle. On the other hand, due to its smaller breakaway torque, the sliding pad avoids the noise generation through the stick-slip-effect.

Figure 3:
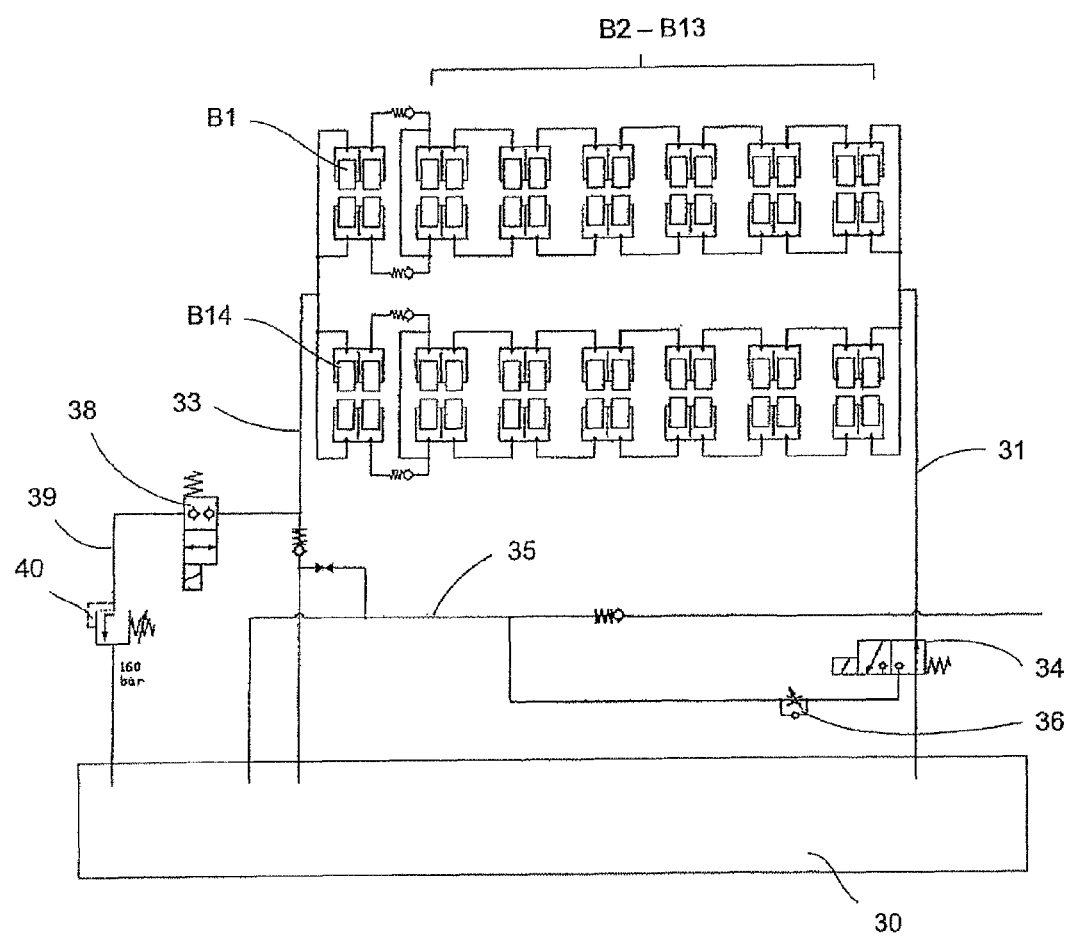
FIG. 3 shows a schematic representation of a hydraulic system for controlling the brake units of the yaw system.

FIG. 3 shows a schematic view of a hydraulic system for actuating the brake units of the yaw system. Via the pressure lines 31 and 33, a central hydraulic unit 30 provides a hydraulic medium for the brake calipers of the brake units B1 to B14. In order to immobilize the nacelle, a holding pressure $p_H$ is applied to all the brake calipers of the brake units B1 to B14. The pressure is applied via pressure lines 31 and 33, wherein the brake calipers of the brake units B2 to B13 are supplied exclusively by the pressure line 31.

During the yaw adjustment of the nacelle, the brake calipers B2 to B13 are depressurized via a 3/2-port valve 34. For this purpose, the 3/2-port valve 34 is closed, so that the hydraulic medium flows off via the line 31, a flow control check valve 36 and the line 35. The hydraulic pressure is reduced to the brake pressure $p_B$ for the brake calipers B1 and B14. For this purpose, the supply from the central hydraulic unit 30 is interrupted and the 2/2-port valve 38 is opened. The hydraulic medium flows off from the brake units B1 and B14 via the lines 39 and 33, wherein a flow control valve 40 limits the pressure to the brake pressure $p_B$.

LIST OF THE REFERENCE SIGNS 2 yaw system
4 machine frame
6 tower
8 yaw bearing
10 inner ring
12 outer ring
14 toothing
16 brake disk
18 adjusting drive
20 gearbox
22 pinion
24 brake calipers
30 central hydraulic unit
31 pressure line
33 pressure line
34 3/2-port valve
35 line
36 flow control check valve
38 2/2-port valve
39 line
40 flow control valve
B1-B14 brake calipers B1-B14

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A wind turbine comprising a tower and a nacelle which is rotatably mounted on the tower and whose alignment is adjustable by means of a yaw system (2), wherein the yaw system has at least one adjusting drive (18), a rotatable yaw bearing (10, 12), at least one brake disk (16) and at least two brake units (B1 to B14) which can exert a braking torque on the brake disk, characterised in that at least one of the brake units (B1, B14) has a first brake pad (17) with a first coefficient of friction, and at least one of the brake units (B2 to B13) has a second brake pad (17) with a second coefficient of friction, wherein the first and the second coefficient of friction are different from each other.

2. The wind turbine of claim 1, wherein the first coefficient of friction is smaller than the second coefficient of friction.

3. The wind turbine of claim 1, wherein the at least one brake unit (B1, B14) having the first brake pad can be actuated independently from at least one brake unit (B2-B13) that has the second brake pad.

4. The wind turbine of claim 1, wherein the brake units (B1-B14) are annularly arranged around a brake disk that is attached on an inner or outer bearing ring (10, 12) of the yaw bearing.

5. The wind turbine of claim 1, wherein the brake units (B1-B14) are actuated hydraulically.

6. The wind turbine of claim 1, wherein the at least one brake unit (B1, B14) having the first brake pad can be pressurized with at least two different brake pressures.

7. A method for yaw adjustment in a wind turbine, comprising a yaw system with at least one adjusting drive (18), a rotatable yaw bearing (10, 12), at least one brake disk (16) and at least two brake units (B1 to B14), of which at least one brake unit has a first brake pad with a first coefficient of friction, and at least one of the brake units has a second brake pad with a second coefficient of friction, wherein the first coefficient of friction is smaller than the second coefficient of friction, with the steps:
    applying a first brake pressure on the at least one brake unit (B1, B14) having the first brake pad,
    releasing the at least one brake unit (B2-B13) having the second brake pad,
    actuating the adjusting drive for adjusting the yaw alignment against the brake pressure that is applied by the at least one brake unit having the first brake pad, and
    applying a second brake pressure on the at least one brake unit having the second brake pad, in order to hold the adjusted yaw alignment.

8. The method of claim 7, wherein the second brake pressure is also applied on the at least one brake unit having a first brake pad, in order to hold the adjusted yaw alignment.

9. The method of claim 7, wherein the first brake pressure is different from the second brake pressure.

10. The method of claim 7, wherein the first brake pressure is equal to the second brake pressure.

* * * * *